(12) United States Patent
Grondahl

(10) Patent No.: US 7,578,509 B2
(45) Date of Patent: Aug. 25, 2009

(54) SEAL ASSEMBLY AND ROTARY MACHINE CONTAINING SUCH SEAL

(75) Inventor: Clayton M. Grondahl, Rexford, NY (US)

(73) Assignee: CMG Tech, LLC, Rexford, NY (US)

( * ) Notice: Subject to any disclaimer, the term of this patent is extended or adjusted under 35 U.S.C. 154(b) by 563 days.

(21) Appl. No.: 10/624,338

(22) Filed: Jul. 22, 2003

(65) Prior Publication Data

US 2004/0150165 A1  Aug. 5, 2004

Related U.S. Application Data

(63) Continuation-in-part of application No. 09/791,248, filed on Feb. 23, 2001, now Pat. No. 6,644,667.

(51) Int. Cl.
*F01D 11/02* (2006.01)
*F16J 15/44* (2006.01)
*F16J 15/447* (2006.01)

(52) U.S. Cl. ........................ 277/355; 277/303
(58) Field of Classification Search ........... 277/355, 277/303, 929, 558, 591, 593, 596, 608, 612, 277/639, 543, 412
See application file for complete search history.

(56) References Cited

U.S. PATENT DOCUMENTS

| | | | |
|---|---|---|---|
| 3,917,150 A | | 11/1975 | Ferguson et al. |
| 4,022,948 A | * | 5/1977 | Smith et al. ............. 428/542.8 |
| 4,204,629 A | | 5/1980 | Bridges |
| 4,209,268 A | | 6/1980 | Fujiwara et al. |
| 4,274,575 A | | 6/1981 | Flower |
| 4,645,217 A | | 2/1987 | Honeycutt, Jr. et al. |
| 4,720,969 A | * | 1/1988 | Jackman ................. 60/39.512 |
| 4,813,608 A | * | 3/1989 | Holowach et al. ...... 239/265.37 |
| 4,940,080 A | | 7/1990 | Reeves et al. |

(Continued)

FOREIGN PATENT DOCUMENTS

DE  100 17 643 A1  10/2001

(Continued)

OTHER PUBLICATIONS

Arora, Gul K. et al., "Pressure Balanced, Low Hysteresis, Finger Seal Test Results," 35th Joint Propulsion Conference and Exhibit, Los Angeles, California, Jun. 20-24, 1999.

(Continued)

*Primary Examiner*—Victor Batson
*Assistant Examiner*—David C Reese
(74) *Attorney, Agent, or Firm*—Hoffman Warnick LLC

(57) ABSTRACT

A seal assembly which, among other applications, may be used for sealing fluid leakage between a steam or combustion (gas) turbine rotor and a turbine stator body. The seal assembly includes elements having a plurality of spaced leaf seal members with slots therebetween. Each leaf seal member is angled out-of-plane between a fixed end and a free end thereof, and the free ends slidably engage the rotatable component. In one embodiment, the fixed ends of each leaf seal member are positioned substantially perpendicular to a longitudinal axis of the rotating component. A support may be provided supporting the free end such that it contacts a distal end of the support in an operative state and is out of contact with the distal end in an inoperative state. Seal members may include two different materials having different coefficients of thermal expansion.

14 Claims, 16 Drawing Sheets

U.S. PATENT DOCUMENTS

| | | | |
|---|---|---|---|
| 5,029,875 A * | 7/1991 | Spain et al. ............... 277/307 |
| 5,042,823 A * | 8/1991 | Mackay et al. ............ 277/355 |
| 5,066,024 A | 11/1991 | Reisinger et al. |
| 5,071,138 A | 12/1991 | Mackay et al. |
| 5,074,748 A | 12/1991 | Hagle |
| 5,076,590 A | 12/1991 | Steinetz et al. |
| 5,090,710 A | 2/1992 | Flower |
| 5,100,158 A | 3/1992 | Gardner |
| 5,106,104 A | 4/1992 | Atkinson et al. |
| 5,108,116 A | 4/1992 | Johnson et al. |
| 5,143,292 A * | 9/1992 | Corsmeier et al. ....... 239/127.3 |
| 5,201,530 A | 4/1993 | Kelch et al. |
| 5,316,318 A | 5/1994 | Veau |
| 5,401,036 A * | 3/1995 | Basu ......................... 277/355 |
| 5,425,543 A * | 6/1995 | Buckshaw et al. ......... 277/350 |
| 5,568,931 A | 10/1996 | Tseng et al. |
| 5,630,590 A | 5/1997 | Bouchard et al. |
| 5,688,105 A | 11/1997 | Hoffelner |
| 5,704,760 A | 1/1998 | Bouchard et al. |
| 5,755,445 A | 5/1998 | Arora |
| 5,794,938 A | 8/1998 | Hofner et al. |
| 5,794,942 A | 8/1998 | Vance et al. |
| 5,799,952 A | 9/1998 | Morrison et al. |
| 5,884,918 A | 3/1999 | Basu et al. |
| 5,961,125 A | 10/1999 | Wolfe et al. |
| 5,961,280 A | 10/1999 | Turnquist et al. |
| 5,975,535 A * | 11/1999 | Gail et al. ................... 277/355 |
| 5,987,879 A | 11/1999 | Ono |
| 5,997,004 A | 12/1999 | Braun et al. |
| 6,010,132 A | 1/2000 | Bagepalli et al. |
| 6,012,723 A | 1/2000 | Beeck |
| 6,027,121 A | 2/2000 | Cromer et al. |
| 6,030,175 A | 2/2000 | Bagepalli et al. |
| 6,032,959 A | 3/2000 | Carter |
| 6,042,119 A | 3/2000 | Bagepalli et al. |
| 6,045,134 A | 4/2000 | Turnquist et al. |
| 6,059,526 A | 5/2000 | Mayr |
| 6,079,714 A | 6/2000 | Kemsley |
| 6,079,945 A | 6/2000 | Wolfe et al. |
| 6,105,966 A | 8/2000 | Turnquist et al. |
| 6,105,967 A | 8/2000 | Turnquist et al. |
| 6,116,608 A | 9/2000 | Wolfe et al. |
| 6,120,622 A | 9/2000 | Mayr et al. |
| 6,131,910 A | 10/2000 | Bagepalli et al. |
| 6,131,911 A | 10/2000 | Cromer et al. |
| 6,139,018 A | 10/2000 | Cromer et al. |
| 6,139,019 A | 10/2000 | Dinc et al. |
| 6,161,836 A | 12/2000 | Zhou |
| 6,168,162 B1 | 1/2001 | Reluzco et al. |
| 6,170,831 B1 | 1/2001 | Bouchard |
| 6,173,958 B1 | 1/2001 | Dinc et al. |
| 6,173,962 B1 | 1/2001 | Morrison et al. |
| 6,220,602 B1 * | 4/2001 | Webster et al. ............. 277/410 |
| 6,267,381 B1 | 7/2001 | Wright |
| 6,352,263 B1 * | 3/2002 | Gail et al. ................... 277/355 |
| 6,457,719 B1 * | 10/2002 | Fellenstein et al. ......... 277/355 |
| 6,739,592 B2 * | 5/2004 | Kono ........................ 277/355 |
| 6,772,482 B2 * | 8/2004 | Crudgington ............... 16/355 |
| 2001/0030397 A1 | 10/2001 | Beichl |

OTHER PUBLICATIONS

Steinetz, Bruce M. et al., "Advanced Seal Technology Role in Meeting Next Generation Turbine Engine Goals," Propulsion and Power Systems First Meeting on Design Principles and Methods for Aircraft Gas Turbine Engines, Toulouse, France, May 11-15, 1998.

"Performance and Reliability Improvements for Heavy-Duty Gas Turbines," GE Power Systems GER-3571H, Apr. 2000, pp. 5-6.

Hendricks, Robert C. et al., "Two-way brush seals catch a wave," 1997 International Gas Turbine & Aeroengine Congress & Exhibition, Orlando, Florida.

"Retractable brush seal optimizes efficiency and availability for cycling and baseloaded steam turbines," http://www.demagdelaval.com.

"Brush seals," http://www.crossmanufacturing.com.

"Brush Sealing Technology for Gas Turbines," http://www.powmat.com.

* cited by examiner

SEAL ASSEMBLY AND ROTARY MACHINE CONTAINING SUCH SEAL

This application is a continuation-in-part application of U.S. Ser. No. 09/791,248, filed Feb. 23, 2001 now U.S. Pat. No. 6,644,667.

BACKGROUND OF THE INVENTION

1. Technical Field

The present invention relates generally to seals for rotary machines and, more particularly, to a seal assembly and rotary machine containing such seal.

2. Related Art

In many rotary machines, such as a gas turbine or jet engine, a gas is compressed in a compressor and mixed with a fuel source in a combustor. The combination of gas and fuel is then ignited for generating combustion gases that are directed to turbine stage(s) that derive energy therefrom. Both turbine stage(s) and compressor have stationary or non-rotating components, e.g., vanes, cooperating with rotating components, e.g., blades, for compressing and expanding the operational gases. The operational gases change in pressure through the machine and a variety of seals are provided to preserve the differential pressures where necessary to maximize machine efficiency and performance. An exemplary seal may be provided between a turbine rotor and a cooperating stator or stator body so the rotor may be pressurized to provide thrust balance relative to the rearwardly directed force generated by the engine and the forward direction of the engine.

In the above-described settings, turbine components and seals exceed the operating temperature range of flexible organic compound elastomer seals used in lower temperature applications. Accordingly, seals used must be capable of operation in a high temperature environment. In addition, the seals used must address the close operating clearances required in machinery of this type. Rotary machine seal design also requires consideration of the relative motion between components produced by the differential thermal expansion that occurs throughout the machinery operating cycle compared to cold clearance at assembly.

One structure commonly provided to control leakage flow along a turbine shaft or other rotating surface is a labyrinth seal. In this setting, a variety of blocking seal strips and obstructions are used between stationary turbine components. Solid labyrinth seals typically have a relatively large clearance to avoid rub damage. Labyrinth seals, therefore, do not maximize machine performance.

Another commonly used seal is a brush seal, which includes a pack of metal bristles that contact a rotor at free ends thereof to maintain a seal with the rotor. The bristles may be inclined relative to the rotor and may be supported by plates. Brush seals have been aggressively pursued in recent years to provide tighter clearances in rotating machinery seal designs because they have some resilience to accommodate rubbing against the rotating component. For instance, in U.S. Pat. No. 5,090,710, issued to Flower, a brush seal is comprised of closely packed fine wires or filaments that are weld assembled in a carrier assembly that is then inserted in a machine with the bristles wiping the rotating surface. The bristles and assembly are fabricated of materials suitable for the fluid temperature and, compared to a labyrinth seal, leakage is reduced through and past the bristles in close contact with the rotating surface.

Brush seals, however, pose a number of deficiencies. First, the multistep brush seal manufacturing process is costly. Second, brush seal bristles do not always maintain a close running clearance because of their inherent inability to withstand long term wear. Third, brush seals exposed to solid particles are subject to erosion or other deterioration. Finally, brush seals are also subject to vibration due to movement of the pressurized fluid being sealed. Therefore, brush seals oftentimes require dampening features.

Another type seal is disclosed in U.S. Pat. Nos. 5,042,823 and 5,071,138, both issued to Mackay et al. These disclosures reveal a laminated finger seal providing a planar array of radially and circumferentially extending fingers separated by gaps. This structure suffers from a number of disadvantages. For instance, each stacked lamination is a solid ring (not segmented) and, therefore, is limited in application to large diameter machines that require installation/replacement without rotor removal. In addition, the finger geometry provided is provided in a substantially radial plane, which may prevent adequate flexure of the fingers.

In addition to the above-identified problems, brush seals and finger seals operating at close running clearance are subject to rubbing and wear when differential thermal expansion of stator and rotor components eliminates clearance altogether. For example during a turbine shutdown, the stator component in which a seal assembly is mounted may cool more quickly than the rotor causing the seal assembly to close on the rotor and rub. The force imposed during such a rub is reduced somewhat with the flexure of brush and finger seal members, but sliding friction nevertheless causes wear and reduces the life of such seals In view of the foregoing, there is a need in the art for a seal assembly having low cost manufacture and capable of withstanding the operational sensitivities described above. In addition, there is a need in the art for a seal assembly that increases seal clearance when differential thermal expansion of components closes stator to rotor separation.

SUMMARY OF THE INVENTION

In accordance with the invention a seal assembly is provided that has a number of seal members or "leaf" seals. The seal assembly may be manufactured from rolled shim stock using wire electro-discharge manufacturing (EDM) to make narrow, precision slots to produce the desired seal member geometry. The seal members may be angled between their free ends and their fixed ends and may include a support for supporting the angle. The invention provides similar benefits as brush seals and finger seals in rotary machine applications but at lower cost and with more robust attributes. Seal member geometry is engineered with respect to thickness, width, length, and number of members to meet specific application requirements of differential pressure and anticipated differential motion. The support serves to limit member movement in one direction and withstand differential pressure, while force imposed by a rub engagement on a rotating component is reduced with the elastic flexure of the seal assembly. Seal member end geometry may be shaped to provide a precision diameter and may also incorporate geometry for aerodynamic lift that would minimize wear in those rotor seal applications that anticipate a heavy transient rub.

In an alternative embodiment, the support may include a curved surface that provides a progressive gap between seal member fixed ends and their end portions under static conditions. As operating differential pressure increases across the seal assembly, leaf seal members deflect, closing the gap with the support causing their free ends to extend inward toward the rotor for a close running clearance. As a prevailing differential pressure across the seal assembly diminishes, e.g., with decreasing rotor speed during a turbine shutdown, the elastically deflected leaf seal member free ends relax and disengage from the rotor because of the leading convex face of the support. The resulting increase in clearance between seal member free ends and the rotor relieves the concurrent differential thermal expansion closure of stator and seal components, which substantially reduces or eliminates sliding friction force and wear of the leaf seal members.

In another alternative embodiment, seal assembly may include leaf seal members having their fixed portion arranged substantially perpendicular to a rotor, a free portion angled relative to the fixed portion to provide an obtuse angle to a high pressure side of the seal assembly, and a support supporting the obtuse angle on the low pressure side of the seal assembly.

In another alternative embodiment, seal assembly may include leaf seal members of bimetallic material. Bimetallic seal members changing shape in response to a change in temperature can relieve the affects of a seal rub when bimetallic seal members are arranged to disengage from the rotor with increasing temperature. Frictional heating during a seal rub increases bimetallic seal member temperature as contact is made with the rotor causing the free portions of the seal members to curl away from the rotor thereby reducing applied rub force and associated wear.

In a first aspect of the invention is provided a seal assembly comprising: a leaf seal including a plurality of staggered leaf seal members, the leaf seal including a fixed portion that is angled relative to a free portion thereof; and a support coupled to the leaf seal for supporting the free portion, the support having a support portion facing a high pressure side of the leaf seal, wherein the free portion contacts a distal end of the support portion in an operative state and is out of contact with the distal end in an inoperative state.

A second aspect of the invention provides a seal assembly for sealing against a rotatable component, the seal assembly comprising: a leaf seal including a plurality of leaf seal members, the leaf seal including a fixed portion that is angled relative to a free portion thereof; and wherein the fixed portion is positioned substantially perpendicular to a longitudinal axis of the rotatable component, and the free portion is, in an inoperative state, angled out-of-plane relative to the fixed portion and slidably engages to seal against the rotatable component at an angle relative to the longitudinal axis in an operative state.

In a third aspect of the invention is provided a rotary machine comprising: a rotatable component and a non-rotatable component, the components lying about a common axis; a seal assembly between the components, the seal assembly including: a leaf seal including a plurality of staggered leaf seal members, the leaf seal including a fixed portion that is angled relative to a free portion thereof; and a support coupled to the leaf seal for supporting the free portion, the support having a support portion facing a high pressure side of the leaf seal, wherein the free portion contacts a distal end of the support portion in an operative state and is out of contact with the distal end in an inoperative state.

In a fourth aspect of the invention is provided a method of fabricating a seal assembly for sealing pressurized chambers of a rotary machine having a stator body and a rotor, the method comprising the steps of: (a) forming a leaf seal including a plurality of leaf seal members, the leaf seal including a fixed portion that is angled relative to a free portion thereof in an inoperative state; and (b) coupling the leaf seal to a support, including a support portion, such that the free portion contacts a distal end of the support portion in an operative state and is out of contact with the distal end in the inoperative state.

A fifth aspect of the invention is directed to a support for use with a leaf seal having a fixed portion and a free portion angled relative to the fixed portion, the support including: a mount portion for mounting the fixed portion; and a support portion for supporting the free portion of the leaf seal, the support portion including a proximate end that contacts the free portion in an operative state and an inoperative state of the leaf seal, and a distal end that contacts the free portion in an operative state and is out of contact with the distal end in an inoperative state of the leaf seal.

A sixth aspect of the invention is directed to a seal assembly comprising: a leaf seal including a plurality of staggered leaf seal members, the leaf seal including a fixed portion that is angled relative to a free portion thereof; and a support coupled to the leaf seal for supporting the free portion, wherein each leaf seal member includes a first layer including a first material addressing a high pressure side of the leaf seal and a second layer of a second material addressing a low pressure side of the leaf seal, wherein the first material has a lower coefficient of thermal expansion than the second material.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE PREFERRED EMBODIMENTS

Figure 1:
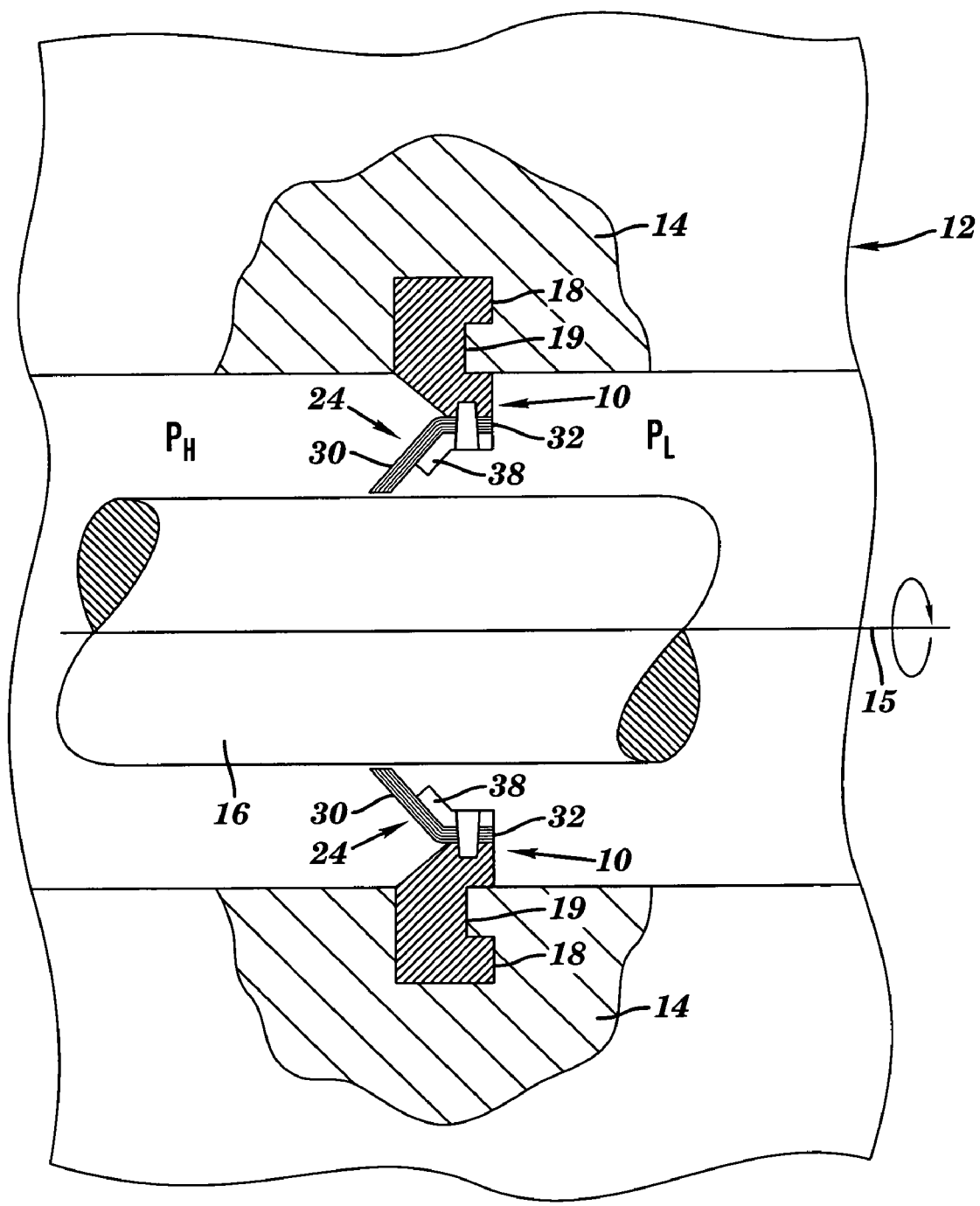
FIG. 1 shows a rotary machine including a first embodiment of a seal assembly in accordance with the present invention.
Figure 2:
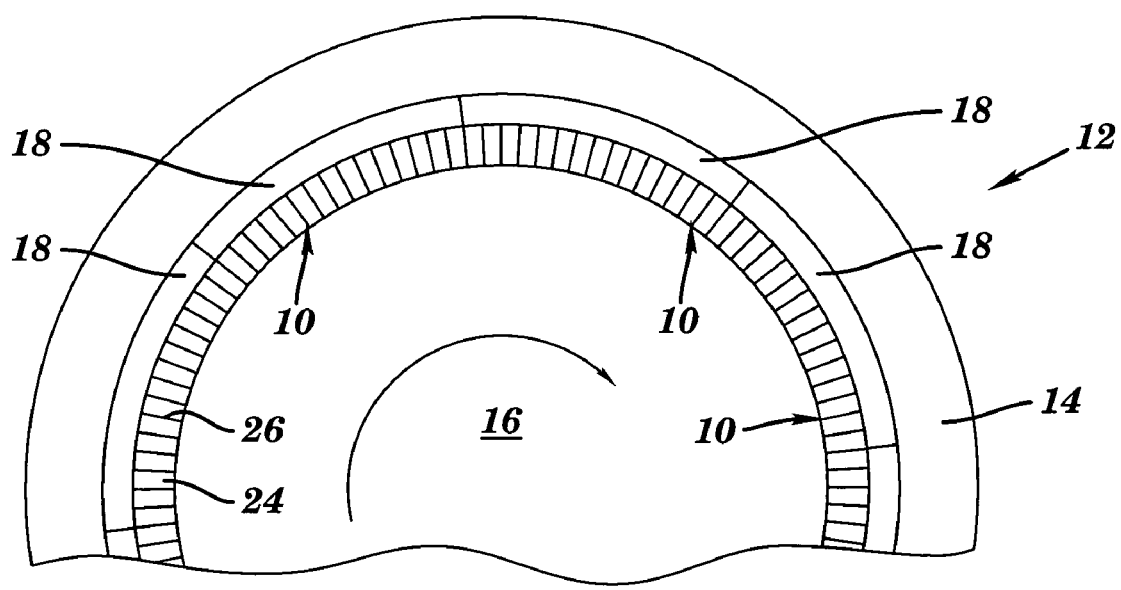
FIG. 2 shows a rotary machine including a number of arcuate seal assemblies.

Referring to FIGS. 1 and 2, the present invention provides a seal assembly 10 for use with a rotary machine 12. Rotary machine 12 may be any well known machinery that includes a non-rotating component 14 and a rotating component 16 having a longitudinal axis 15, e.g., a gas turbine, a jet engine, a steam turbine, etc. For description purposes, the present invention will be described in terms of a steam or combustion (gas) turbine having a stator or stator body 14 and a rotor 16. As shown in FIG. 1, a higher pressure chamber $P_H$ and a lower pressure chamber $P_L$ are generated during steady state operation of rotary machine 12. Pressure from higher pressure chamber $P_H$ is exerted against at least part of seal assembly 10, which acts to seal higher pressure chamber $P_H$ from lower pressure chamber $P_L$. FIG. 2 shows an embodiment of rotary machine where a number of arcuate seal assemblies 10 are utilized about rotating component 16.

Figure 3:
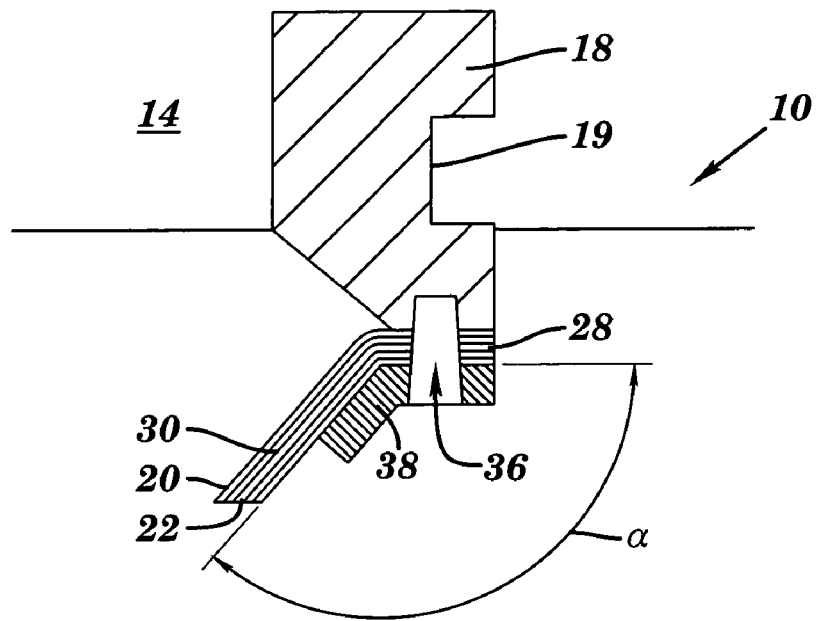
FIG. 3 shows a cross-sectional view of the first embodiment of the seal assembly of FIG. 1.
Figure 4:
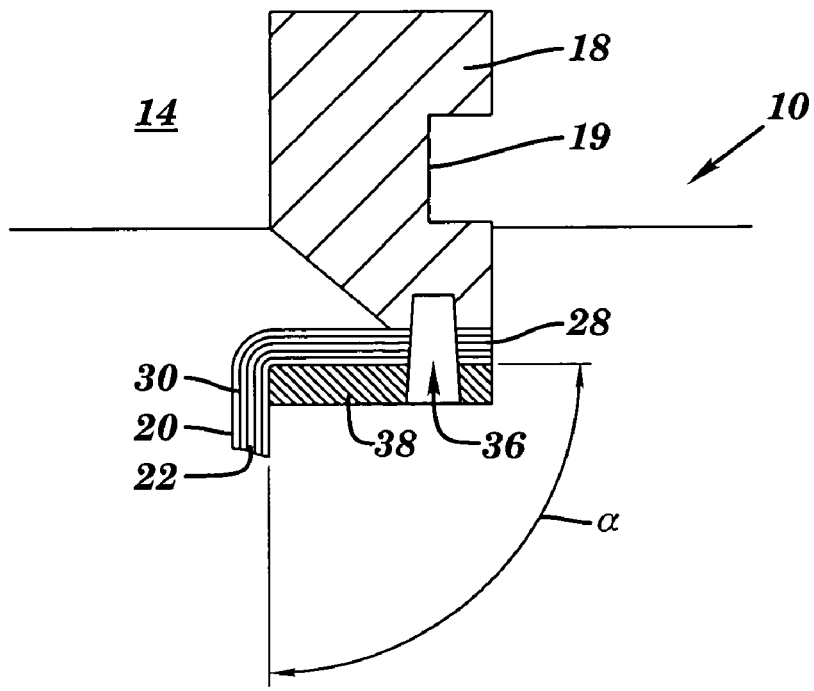
FIG. 4 shows a cross-sectional view of a second embodiment of the seal assembly.

Turning to FIGS. 3 and 4, seal assembly 10 includes at least a first element 20 and a second element 22, and preferably three or more elements 20, 22. Elements 20, 22 are layered together (juxtaposed) and carried by non-rotating component 14. Elements 20, 22 are preferably made of a heat resistant material, e.g., a nickel-based or cobalt alloy material. Elements 20, 22 also have a thickness, width, length and number set to meet application requirements such as differential pressure and differential motion of the particular rotary machine 12 at issue. In a preferred embodiment, elements 20, 22 are coupled to a holder 18 that is coupled to non-rotating component 14. Each seal assembly 10 is preferably provided as an arcuate structure such that a number of seal assemblies 10 can be circumferentially disposed about rotating component 16 to create a seal. In this case, as shown in FIGS. 1, 3 and 4, holder 18 is preferably non-rotatably held in a key slot 19 of non-rotating component 14 that is concentric with rotating component 16. As an alternative embodiment, however, seal assembly 10 may be provided as an annulus and elements 20, 22 may be provided by a spiral of a single strip of material. While a particular structure has been disclosed for holding seal assembly 10, it should be recognized that a number of other mechanisms of mounting seal assembly 10 to non-rotating component 14 may be possible.

Figure 5:
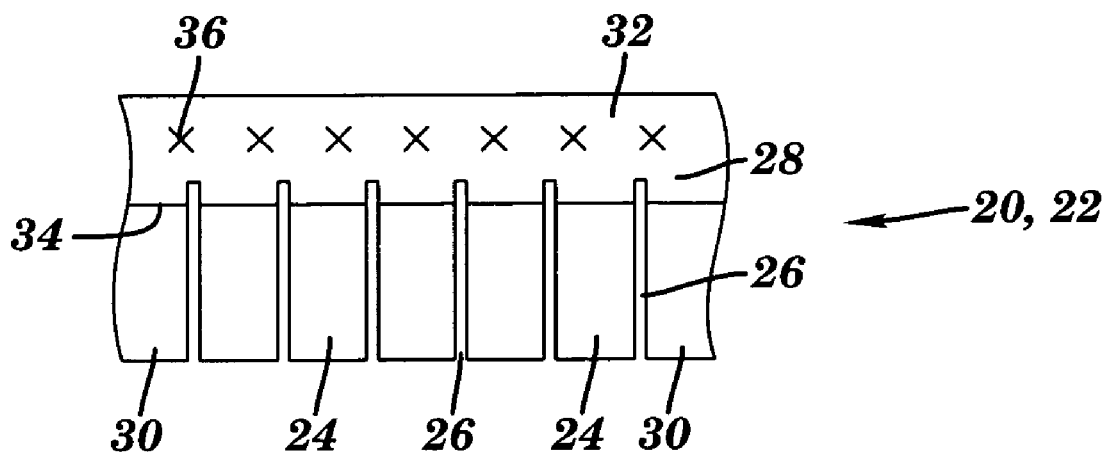
FIG. 5 shows a detail view of a first embodiment of seal members of an element of the seal assembly.

FIG. 5 illustrates how each element 20, 22 includes a plurality of spaced leaf seal members 24 having slots 26 therebetween. Each seal member 24 includes a fixed end or portion 28 and a free end or portion 30. While a variety of mechanisms may be used to fix ends 28, preferably each fixed end 28 is provided by forming sealed members 24 integrally with a band portion 32 of each element 20, 22. Once assembled, band portions 32 of each element 20, 22 are preferably coupled to form a single band portion to prevent relative motion of the elements 20, 22 by welding at or near fixed ends 28 of each seal member 24. A weld 36 may be provided through elements 20, 22 and a support 38 (FIGS. 3, 4)(discussed below) to couple them to holder 18. Weld 36 may be provided as, for example, a laser or electron beam weld.

Figure 6:
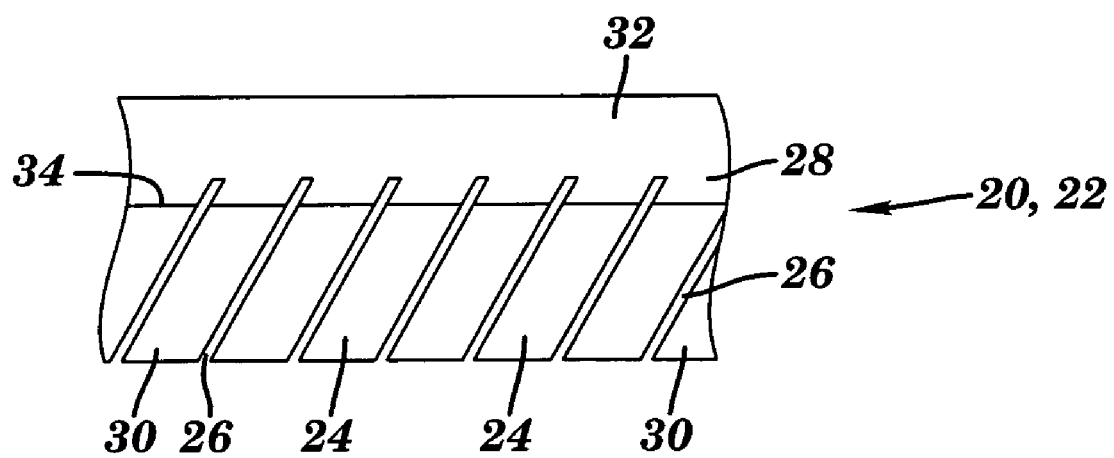
FIG. 6 shows a detail view of a second embodiment of seal members of an element.
Figure 7:
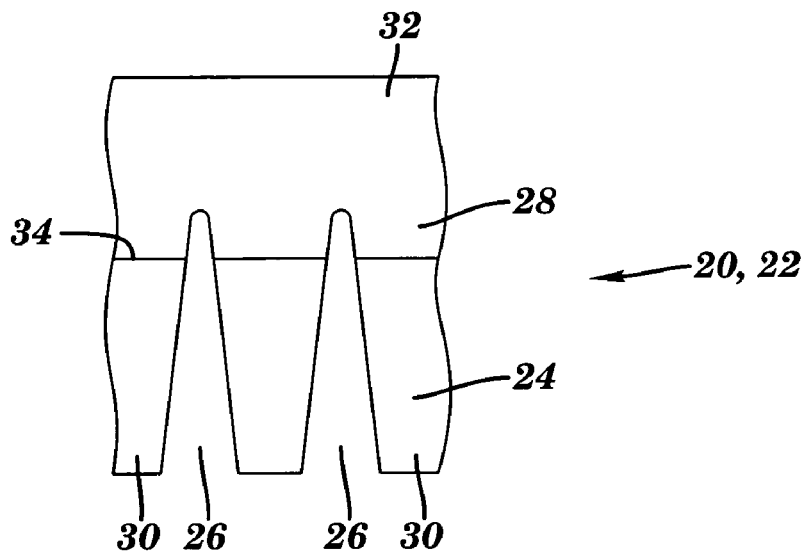
FIG. 7 shows a detail view of a third embodiment of seal members of an element.
Figure 8:
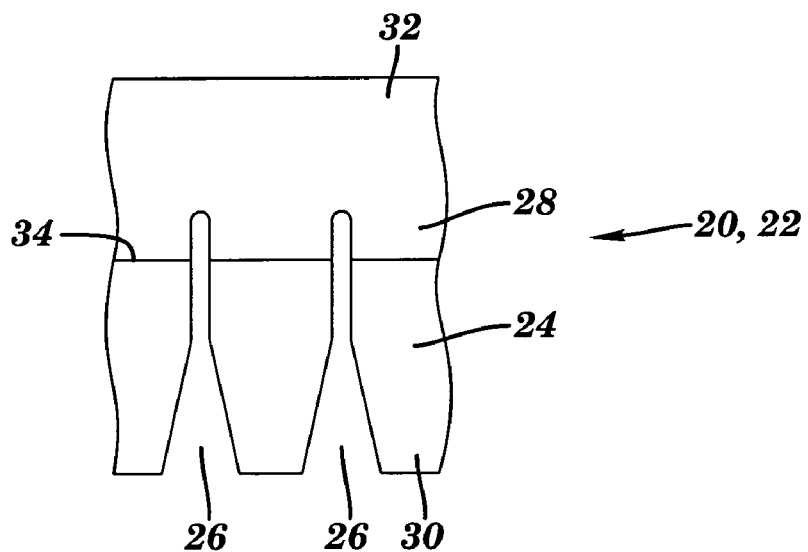
FIG. 8 shows a detail view of a fourth embodiment of seal members of an element.
Figure 9:
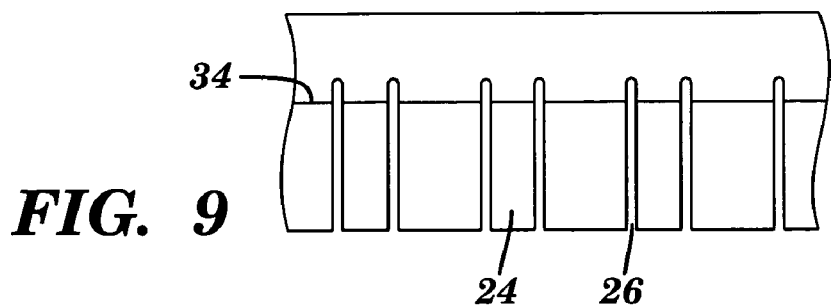
FIG. 9 shows a detail view of a fifth embodiment of seal members of an element.
Figure 10:
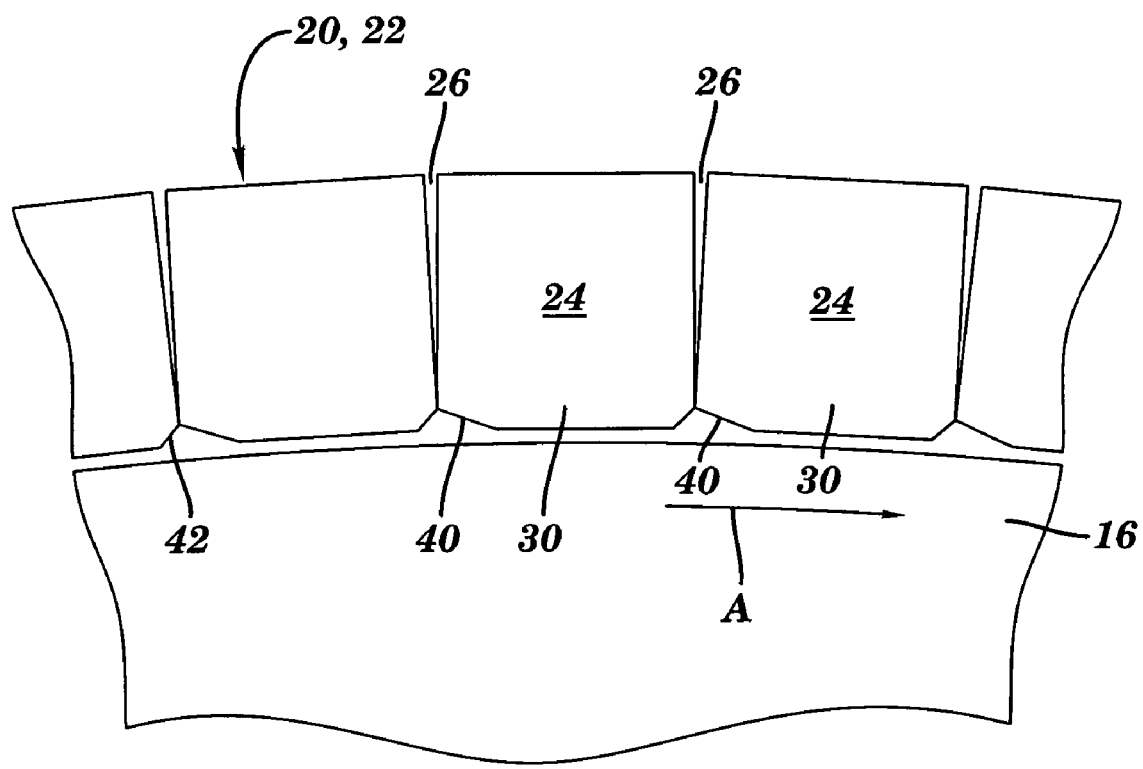
FIG. 10 shows a partial detail view of an element mounted adjacent a rotating component of a rotary machine.

As illustrated in FIGS. 5-9, slots 26 may be provided in a variety of shapes and dispositions in elements 20, 22. In FIG. 5, slots 26 are provided in elements 20, 22 such that they extend substantially perpendicular to free ends 30. FIG. 6 illustrates slots 26 that extend at a substantially non-perpendicular angle relative to free ends 30. FIGS. 7 and 8 illustrate slots 26 that diverge at least partially from fixed end 28 to free end 30. A divergent configuration may be advantageous where seal members 24 interfere with one another when seal assembly 10 is mounted, e.g., on a small rotatable component 16. For instance, as shown in FIG. 10, when a seal assembly 10 is mounted, elements 20, 22 are arced such that seal members 24 converge at their free ends 30. Divergent slots may prevent interference between free ends 30 of adjacent seal members 24. In FIG. 7, slots 26 are V-shaped, and in FIG. 8, slots 26 are funnel-shaped. FIG. 9 illustrates that seal members 24 do not have to be uniformly spaced in each element 20, 22. That is, seal members 24 may have different circumferential widths.

Figure 11:
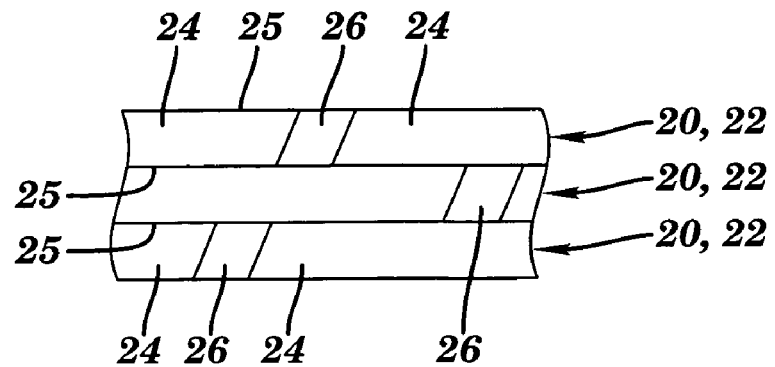
FIG. 11 shows a detail view of a number of elements configured with staggered slots.
Figure 12:
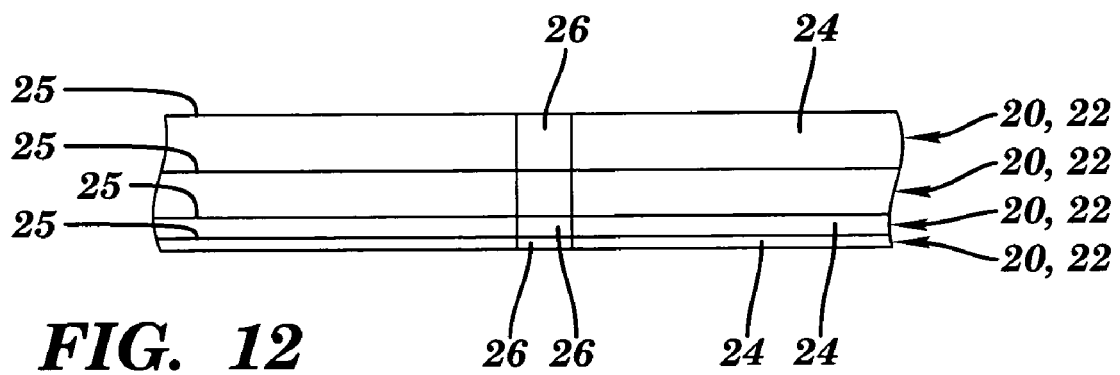
FIG. 12 shows a detail view of a number of elements configured with non-staggered slots.

Turning to FIG. 11, slots 26 may also be provided at a non-perpendicular angle relative to a surface 25 of each element 20, 22. FIG. 11 also illustrates how, in a preferred embodiment, slots 26 of elements 20, 22 are staggered between elements 20, 22. That is, elements 20, 22 are preferably juxtaposed such that seal members 24 of each element 20, 22 block slots 26 of another element 20, 22. This configuration reduces leakage through seal assembly 10. However, as an alternative embodiment, shown in FIG. 12, slots 26 can be provided in a non-staggered or aligned disposition between elements 20, 22. This may be advantageous where a certain amount of leakage between chambers $P_H$ and $P_L$ is acceptable or desired. FIG. 12 also illustrates another alternative embodiment in which seal assembly 10 is constructed of a number of elements 20, 22 that are not of uniform axial thickness.

Returning to FIGS. 3 and 4, each seal member also preferably includes an angle α between their respective fixed end 28 and free end 30 thereof. The inwardly-extending angle α results in fixed end 28 being arranged at a non-perpendicular angle relative to a longitudinal axis of rotatable component 16 and free end 30 being arranged at an angle relative to fixed end 28 and toward rotatable component 16. The bend location of angle α is indicated in FIGS. 5-9 as line 34. FIG. 3 illustrates an angle α of approximately 135 degrees, which presents seal members 24 at approximately 45 degrees relative to rotating component 16. FIG. 4 illustrates an angle α of approximately 90 degrees, which presents seal members 24 at approximately 90 degrees, i.e., radial, relative to rotating component 16. It should be recognized that while two preferred angles have been presented, angle α may be set at any other angle that is necessary for the specific design in issue. Seal assembly 10 may also include a support 38 for supporting the angle α and seal members 24. Support 38 preferably bears a substantial portion of the seal assembly's differential pressure with minimal distortion during normal operating conditions. In either seal assembly configuration, angle α and support 38 provide relief between seal members 24 and holder 18. This relief functions to accommodate relative motion between non-rotating component 14 and rotating component 16 when seal members 24 rub on rotating component 16. Since the full length of seal member 24 may be deflected during such a rub, the seal member tip (free end) force on rotating component 16 is reduced. As mentioned above, a weld 36 may be provided through elements 20, 22 and support 38 to couple elements 20, 22 to holder 18.

Referring to FIG. 10, as an alternative embodiment, each seal member 24 may also include a circumferentially extending notch 40 at their respective free ends 30. In a preferred setting, each notch 40 faces a direction of rotation, indicated by arrow A, of rotatable component 16. A circumferentially extending mating notch 42 may also be provided in an opposite side of each free end 30. Notches 40 are advantageous, inter alia, to provide aerodynamic lift to minimize wear in those applications that anticipate a heavy transient rub. This situation may exist, for instance, where slots 26 are not staggered between elements 20, 22.

Figure 13:
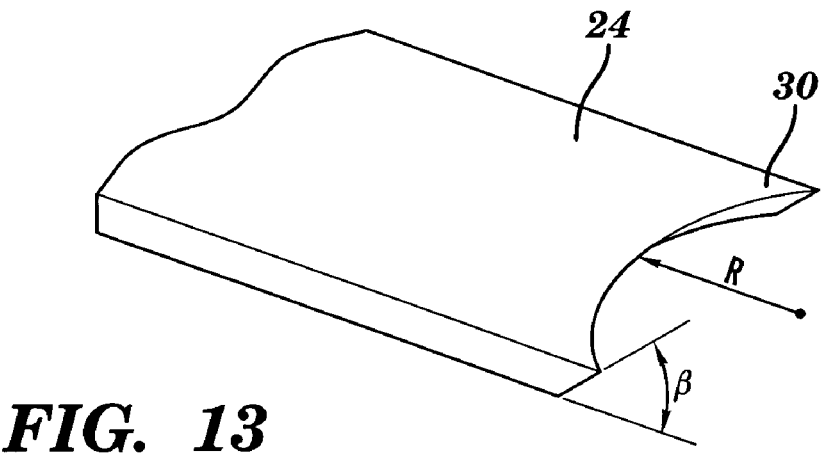
FIG. 13 shows a detail view of a seal member including alternative surfaces for mating with a rotating component of a rotary machine.
Figure 14A:
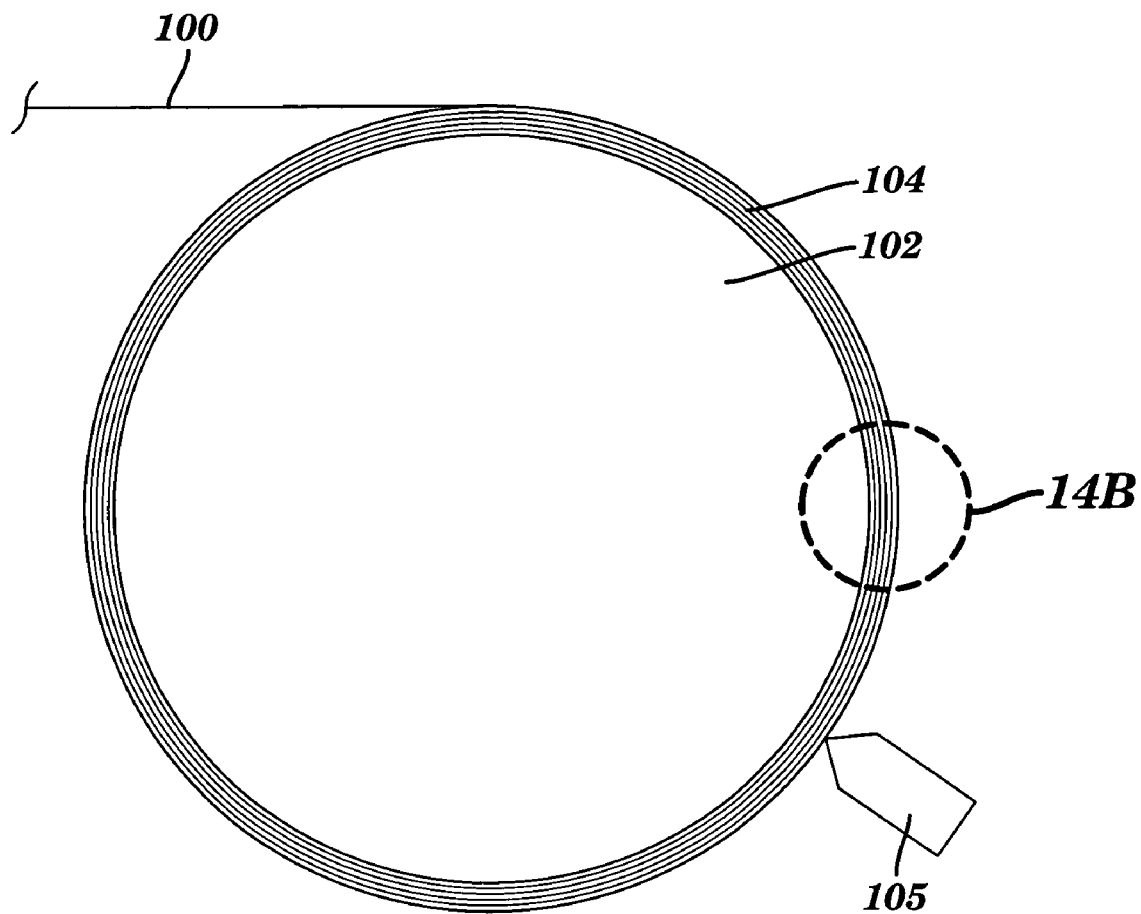
FIG. 14A-B show a side view and a detail view of a first embodiment of a method of fabrication of the seal assembly.
Figure 14B:
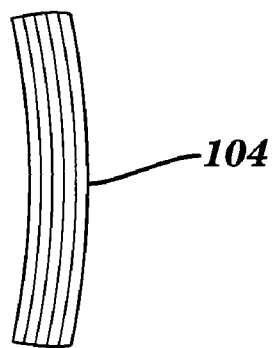

Another alternative embodiment is illustrated in FIG. 13, in which the free end 30 of each seal member 24 is formed to mate with a surface of rotating component 16. For example, free ends 30 may be formed or cut to include an angle β such that free end 30 is axially parallel a surface of rotatable component 16 when in operation. Angle β may be substantially similar to angle α. An additional alternative embodiment, shown in FIG. 13, includes having the free end 30 of each seal member 24 formed to be circumferentially parallel a surface of rotatable component 16. In this case, free end 30 of each seal member is formed or cut to a radius R to substantially mimic an outer diameter of rotating component 16.

It should be recognized that the seal assembly 10 in accordance with the present invention may be combined with one or more labyrinth seals and/or one or more brush seals (not shown) to provide further sealing capacity.

In operation, as shown in FIG. 1, seal assembly 10 is carried by non-rotating component 14 in such a way that free ends 30 of seal members 24 slidably engage rotating component 16. As one with skill in the art will recognize, cold assembly of seal assembly 10 and rotary machine 12 may require non-contact of parts to accommodate eventual thermal expansion. Seal assembly 10 creates a seal between chambers $P_H$ and $P_L$ and seal members 24 resist flexure in one direction by the provision of angle α and support 38.

Referring to FIGS. 14-19, a first preferred embodiment for the fabrication of seal assembly 10 is illustrated. As shown in FIGS. 14A-B, a strip of material 100, preferably ribbon shim stock, of requisite thickness, width and material is first layered. Layering is preferably provided by winding strip of material 100 onto a mandrel 102 to form an annulus having a number of layers needed for a particular seal design. Mandrel 102 is preferably annular and has an outer diameter that is sized such that the outside diameter of the roll of material 104 once completed corresponds to an inside diameter of holder 18 (FIG. 1) or other structure to which seal assembly 10 is connected.

Figure 15:
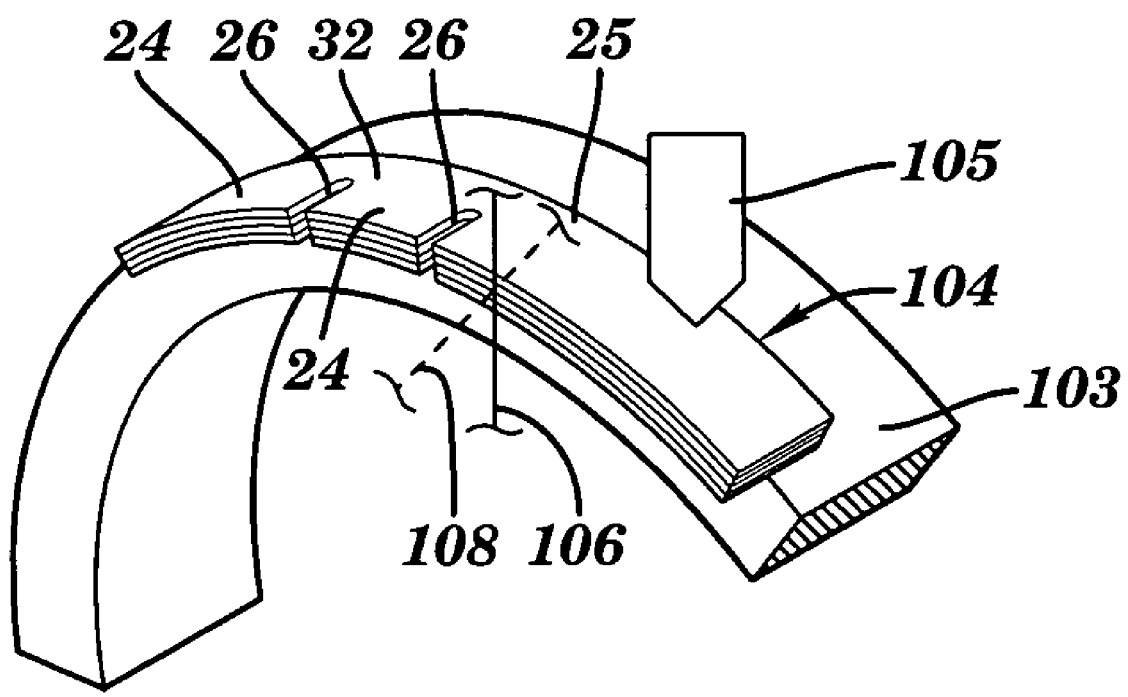
FIG. 15 shows a detail view of seal member slot cutting according to the method of fabrication.
Figure 16:
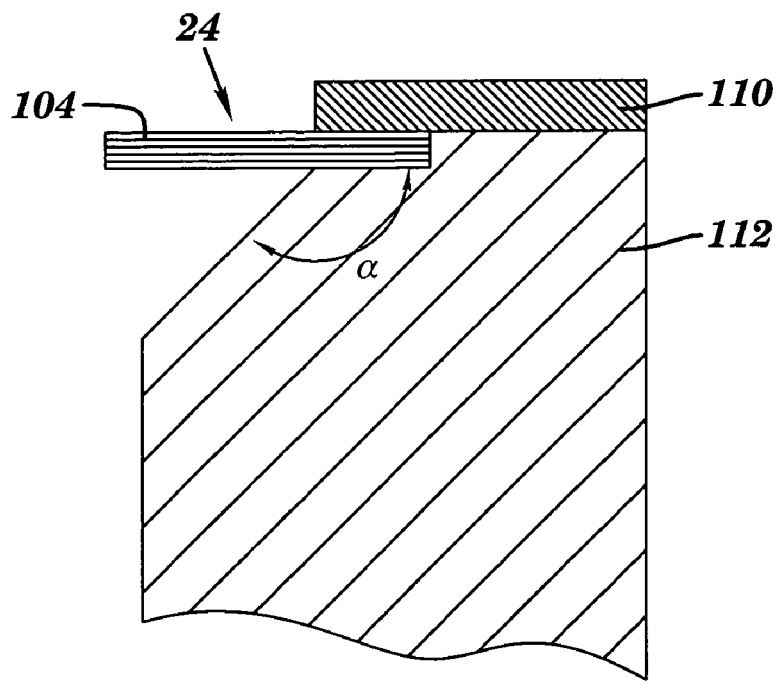
FIG. 16 shows a detail view of the seal assembly shown in FIG. 3 prior to formation of a seal member angle.
Figure 17:
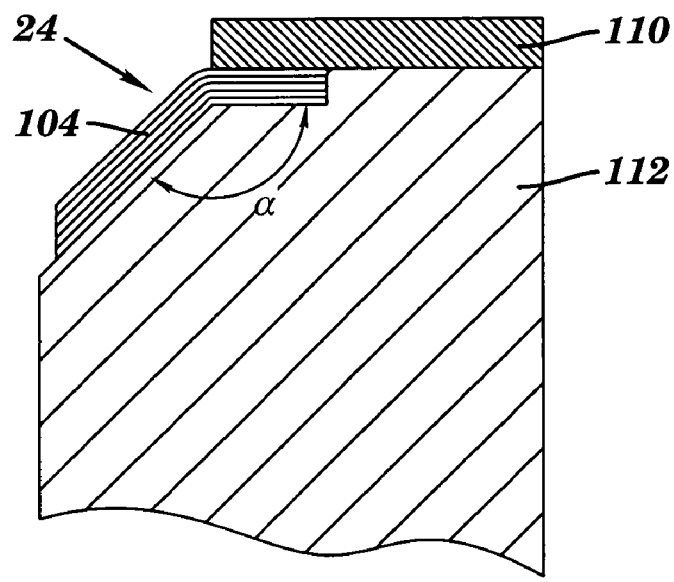
FIG. 17 shows a detail view of angle formation of the seal assembly shown in FIG. 3.
Figure 18:
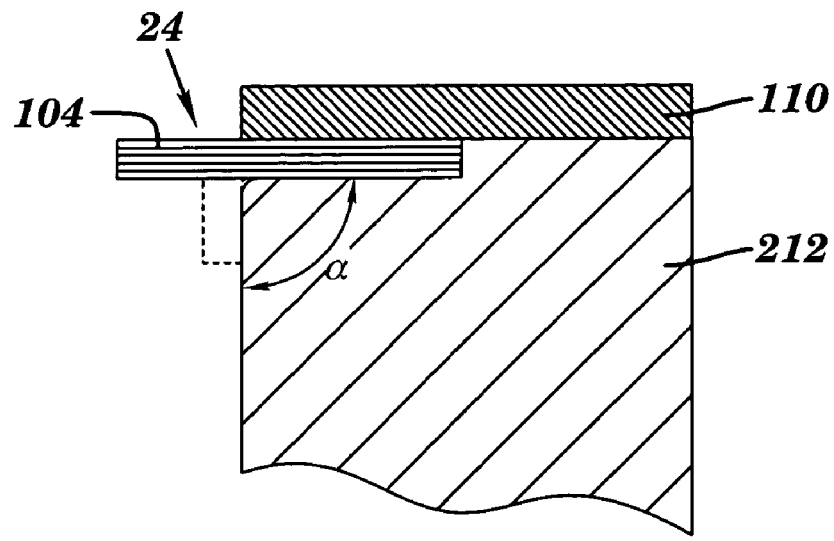
FIG. 18 shows a detail view of the seal assembly shown in FIG. 4 prior to formation of the seal member angle.
Figure 19:
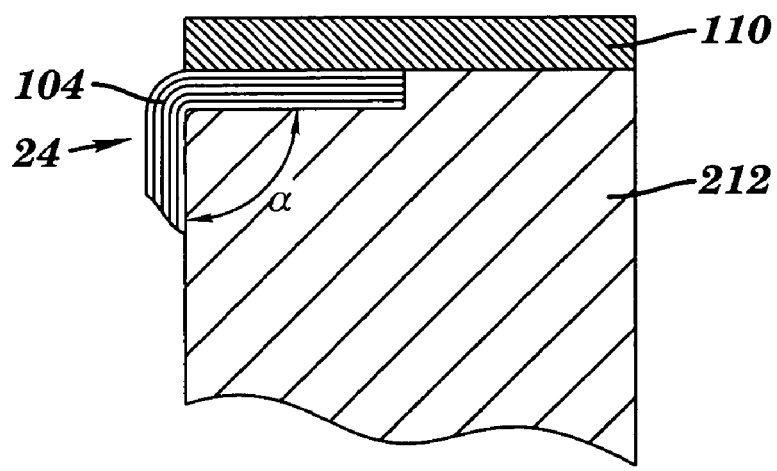
FIG. 19 shows a detail view of angle formation of the seal assembly shown in FIG. 4.

Next, roll of material 104, part of which is shown in FIG. 15, is preferably transferred to a fixture 103, e.g., a ring fixture, for support. While supported on fixture 103, slots 26 are cut in an edge of material 104 to form the plurality of seal members 24 coupled to a band portion 32. Slots 26 extend through the thickness of roll of material 104. A preferred method of cutting slots 26 is using wire electro-discharge machining (EDM) 106 (shown conceptually). EDM 106 has been found advantageous because it does not raise a burr, can produce narrow slots (e.g., down to 0.002 inches), utilizes computer controlled positioning to readily produce complex shapes, and does not involve heavy tool force. It should be recognized, however, that other mechanisms of creating slots 26 may also be used. Furthermore, mandrel 102 may be so structured that the transfer of roll of material 104 may not be necessary.

As discussed above with reference to FIGS. 5-9, slots 26 may be provided in a variety of different shapes. For example, as illustrated in FIG. 15, slots 26 may be cut perpendicular relative to a surface 25 of elements 20, 22 (i.e., along line 106) and extend substantially perpendicular to free ends 30, i.e., radially relative to rotating component 16, once assembled. Alternatively, slots 26 may be cut at a non-perpendicular angle relative to surface 25 of elements 20, 22, i.e., along line 108. Wire EDM 106 is capable of producing any slot geometry, shown in FIGS. 5-9, or other combination of geometries as may be required for a specific seal design.

If staggering of slots 26 is desired, it is preferably provided next by re-layering roll of material 104 such that seal members 24 of each element/layer block at least one slot 26 of another element/layer. Re-layering is preferably provided by winding roll of material 104 onto a mandrel (not shown) having different dimensions than mandrel 102, which repositions slots 26 to the desired staggered configuration. In this way, leaf seal members of one revolution block slots of at least one other revolution.

Next, a consolidation of roll of material 104 is provided by, for example, resistance welding 105 roll of material 104 through an edge of the roll of material that does not include slots 26, i.e., band portion 32. In this setting, whatever structure is supporting roll of material 104, e.g., mandrel 102 or fixture 103, may be made of, or coated with, a suitable material (not shown) to facilitate complete consolidation through roll of material 104.

Referring to FIGS. 16-19, the next step of fabrication is to form angle α in each seal member 24. As indicated above, seal members may be provided with an angle α of, for example, approximately 135° or of approximately 90°. As illustrated in FIGS. 16-19, one method of providing angle α is to clamp 110 slotted roll of material 104 to a mandrel 112, 212. Mandrel 112 (FIGS. 16 and 17) provides the approximately 135° angle and mandrel 212 (FIGS. 18 and 19) provides the approximately 90° angle. In the case of mandrel 112, forming angle α results in an inwardly frusto-conically shaped portion having the plurality of spaced leaf seal members 24 with slots 26 therebetween that is coextensive with band portion 32 and extends inwardly from band portion 32 towards rotatable component 16. In either case, the slotted material 104 is secured to a mandrel with geometry needed to form angle α in seal members 24. Consideration for material properties that affect spring back from mandrel 112, 212 shape should be anticipated in choosing mandrel 112, 212. Forcing seal members 24 to conformity with mandrel 112, 212 would include those techniques applied in sheet metal fabrication such as peening or rolling, but may include pressure forming, hydrostatic forming, explosive forming or any other now known or later developed technique.

Next, referring to FIG. 1, band portions 32 are coupled to non-rotating component 14, e.g., a stator body, of rotary machine 12. As discussed above, elements 20, 22 and support 38 are preferably welded to holder 18, which is coupled to non-rotating component 14. Seal members 24 are mounted in such as way that they slidably engage rotating component 16 of rotary machine 12, when in operation, to seal the pressurized chambers $P_H$ and $P_L$. In a preferred embodiment, holder 18 is an annulus with a cross-sectional geometry capable of mounting either of seal assembly configuration discussed above. Compatible structure, e.g., key slot 19, for holder 18 is provided in non-rotating component 14 in a known fashion to maintain seal concentricity with rotating component 16 and secure holder 18 from rotation.

An alternative step to the above-described process may include separating roll of material 104 after connection to annular holder 18 into arcuate segments so that a number of seal assemblies 10 may be circumferentially arranged about rotating component 16, as shown in FIG. 2. Segmentation of seal assembly 10 is advantageous for shipping, handling and assembly requirements. In addition, segmented seal assemblies 10 makes replacement easier. Segmentation is preferably provided by making radial, narrow kurf cuts by wire EDM in roll of material 104 and annular holder 18. As with an annular seal assembly, provisions for anti-rotation of arcuate seal assemblies, such as those used in brush seal applications, may be provided to complete the fabrication.

Another alternative step includes forming free ends 30 of seal members 24 to conform to a surface of rotating component 16, as shown in FIG. 13. That is, shape free ends 30 to be axially parallel a surface of rotatable component 16 and/or circumferentially parallel a surface of rotatable component 16. Furthermore, notches 40, 42 may be provided at this stage where slots 26 are not staggered. Precise numerical control of the wire EDM operation can accommodate the above features.

Figure 20A:
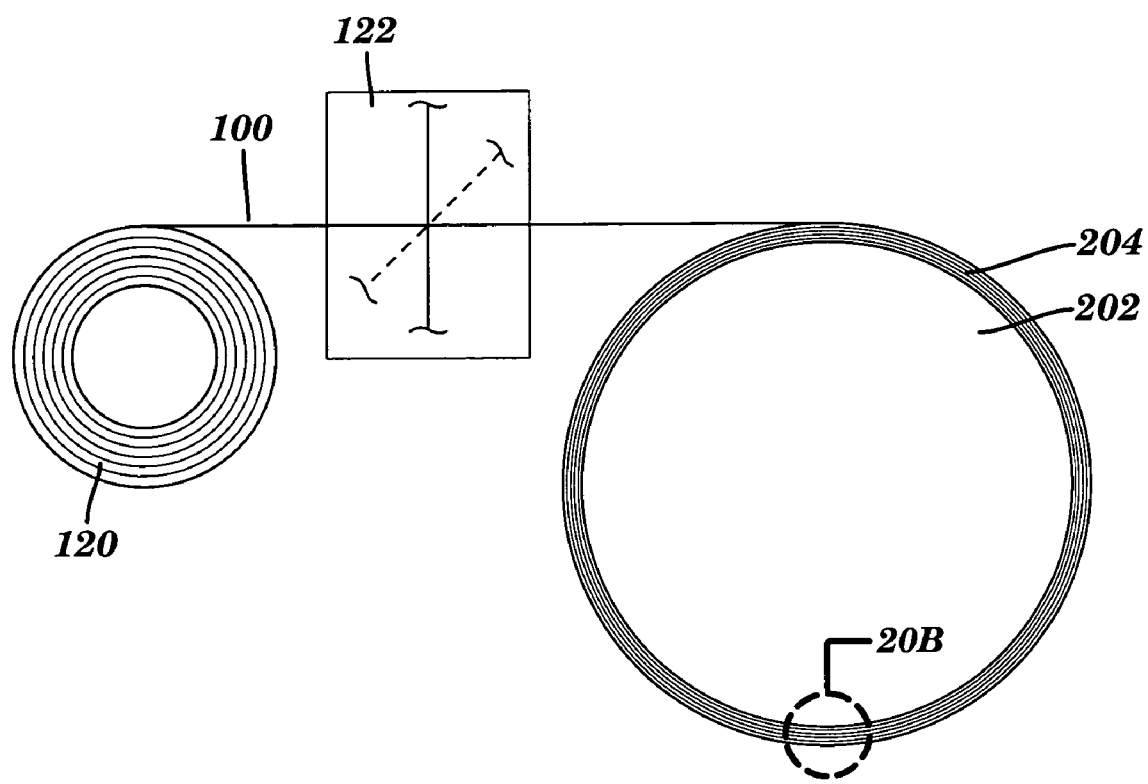
FIGS. 20A-B show a side view and a detail view of a second embodiment of a method of fabrication of the seal assembly.

Referring to FIG. 20, an alternative embodiment of the method of fabrication is illustrated in which the step of cutting slots 26 into an edge of the strip of material 100 precedes the step of layering the strip of material 100. In this approach, a strip of material 100 is provided from a stock of material 120 and is slotted one individual layer at a time as it is fed through an EDM machine 122. Any of the slot geometries discussed above may be provided by EDM machine 122. The slotted material is then wound on a mandrel 202, as described above, to produce a roll of material 204 having an outer diameter that corresponds to an inner diameter of holder 18 or other structure to which seal assembly 10 is to be mounted.

Figure 20B:
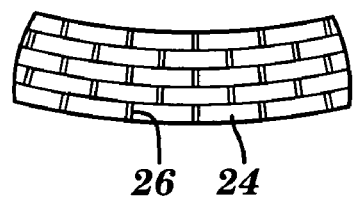

This method can also automatically produce multiple layers of elements 20, 22 that have staggered slots 26 as shown in the enlarged view of roll of material 204, shown in FIG. 20B. That is, elements 20, 22 are juxtaposed such that seal members of each element/layer block slots of another element/layer.

The rest of the process of fabrication in accordance with the second preferred embodiment is substantially similar to that of the first embodiment.

The present invention also includes a method of inhibiting fluid flow through an annular slot (i.e., chambers $P_H$ and $P_L$) defined between a stator body 14 and a rotor 16 received in the stator body 14, the rotor having longitudinal axis 15 (FIG. 1), the method including the steps of: disposing on the stator body 14 a plurality of arcuate elements 20, 22 each having a band portion 32 and an integral plurality of circumferentially disposed seal members 24 having slots 26 therebetween, wherein the seal members 24 includes an angle α therein and extend inwardly from the stator body at an angle relative to the longitudinal axis to slidably contact rotor 16 along a circumference thereof; circumferentially aligning and axially juxtaposing elements 20, 22; employing the cooperatively disposed elements 20, 22 to define an annular seal extending between the stator body 14 and the rotor 16; and inhibiting fluid flow through the annular slot with the annular seal.

Figure 21C:
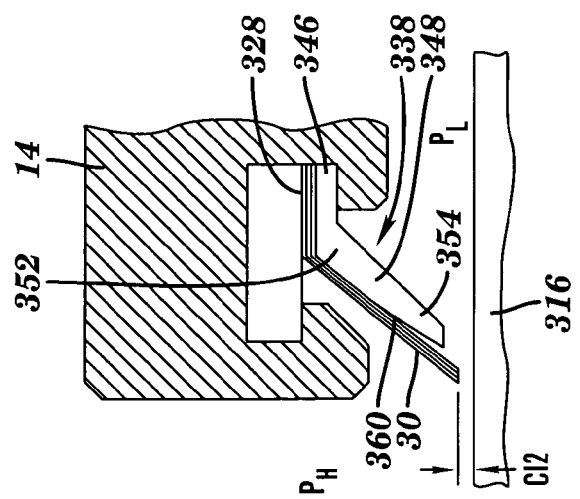
FIGS. 21A-C shows cross-sectional views of operational states of a third embodiment of the seal assembly.
Figure 21B:
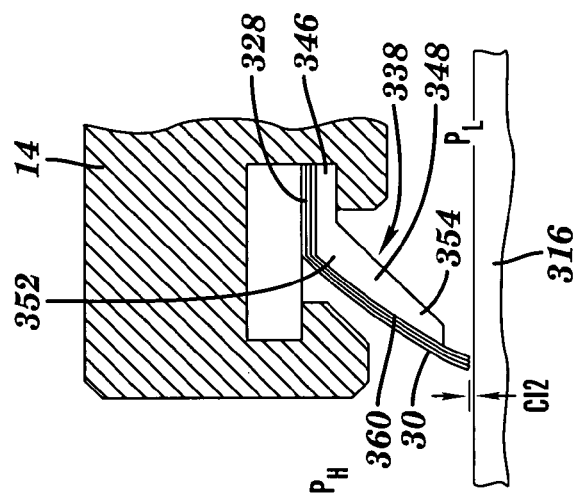
Figure 21A:
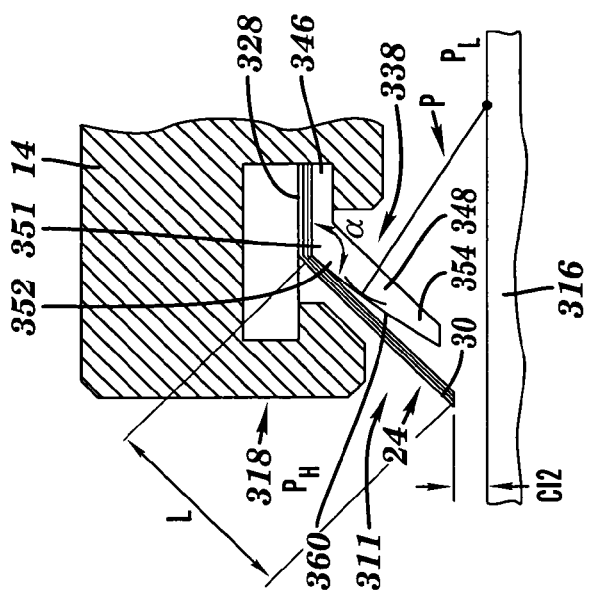

Referring to FIG. 21A, as an alternative embodiment, a seal assembly 310 may include a leaf seal 311 including a plurality of staggered leaf seal members 324 similar to those described above. Leaf seal 311 includes a fixed portion 328 and a free portion 330. Seal assembly 310 also includes a support 338 having a mount portion 346 and a support portion 348, the latter of which faces a high pressure side $P_H$ of leaf seal 311. Mount portion 346 couples support 338 to a stationary component 314. Support portion 348 is coupled to leaf seal 311 for supporting free portion 330.

FIG. 21A illustrates the position of free portion 330 during an inoperative state with low or no differential pressure $P_H$-$P_L$ and with a clearance Cl1 between free portion 330 and rotating component 316. FIG. 21B shows the position of free portion 330 during a hot, running operative state (FIG. 21B) with high operating conditions' differential pressure, $P_H$-$P_L$, and with a clearance Cl2 between free portion 330 and rotating component 316. Comparing FIGS. 21A and 21B, in one embodiment, free portion 330 is out of contact with a distal end 354 of support portion 348 in the inoperative state (FIG. 21A), and contacts distal end 354 in an operative position (FIG. 22B). Thermal expansion and centrifugal growth of rotating component 316 also contributes to reduced seal clearance as illustrated in FIG. 21B. In one embodiment, free portion 330 is formed at a cold-relaxed angle α relative to fixed portion 328, and support 338 includes a curved surface 360 extending from a proximate end 352 to distal end 354 of support portion 348 such that free portion 330 extends tangentially from curved surface 360 at a point 351 in an inoperative state. FIG. 21C shows an intermediate state in which differential pressure, $P_H$-$P_L$, is diminished and leaf seal free portion 330 elastically disengages from rotor 316 as illustrated by increased clearance Cl3 compared to clearance Cl2 in FIG. 21B.

The shape of curved surface 360 is chosen in cooperation with leaf seal member 324 length, L, and thickness, T, to have free portion 330 extend tangentially from curved surface 360 in an inoperative state, i.e., cold state, such that free portion 330 is disengaged from a majority of support portion 348, as shown in FIG. 21A. In addition, curved surface 360 is chosen to attain a desired elastic flexure of free portion 330 inward toward rotating component 316 and into engagement with support portion 348 at operating conditions, as shown in FIG. 21B in which running clearance Cl1 is very small. The change in clearance created by this structure can be made large enough to disengage or distance free portion 330 sufficiently to avoid rubbing contact with rotating component 316 as applied differential pressure, $P_H$-$P_L$, diminishes.

Although the structure of support portion 348 that provides for the tangential extension of free portion 330 has been described as a "curved surface," it should be recognized that a variety of other functionally equivalent structure(s) may be provided to create the above-described operation. For instance, distal end 354 of support portion 348 may be constructed to simply be thinner than proximate end 351; support portion 348 may be constructed to include a number of planar surfaces that, in combination, form a functional equivalent to curved surface 360; or support portion 348 may include a ridge that supports free portion 330 in a tangentially extending fashion. When curved surface 360 is provided, it may be formed to a particular contour radius ρ (FIG. 21B). In this case, seal member bending stress σ equals E*T/2ρ to ensure seal member 324 elastically deflect into contact with second portion 348 of support 338 by applied operating differential pressure, $P_H$-$P_L$. In the equation, T is seal member 324 thickness, and E is the modulus of elasticity of the seal member material. An illustrative material is heat resistant sheet metal such as AMS 5537 (Haynes 25 alloy or alloy L-605). Typical tensile properties of this material when cold worked and aged include 0.2% yield strength in excess of 120,000 psi at temperatures between 600° F. and 1000° F. A contour radius ρ of, for example, 1.3 inch induces bending stress that is within AMS5537 yield stress for seal members up to 0.010 inches in thickness.

It is recognized that contour radius p in support portion 348 creates a three-dimensional surface of revolution and that seal members 324 may not be compliant along the arc subtended by individual seal members and some stress concentration will occur. Parts of free portion 330 extending below distal end 354 of support portion 348 are exposed to differential pressure without support, inducing additional cantilever bending stress. To assure seal members 324 elastically return to original shape at shut down, the sum of cantilever bending stress and contour bending stress must not exceed material yield stress. Attention is also given to the selection of seal member length L, along with thickness T, and the number of cooperating seal member 324 layers that will bring seal members 324 into elastic contact with support portion 348 of support 338 under operating differential pressure without excessive contact force. In such a design, seal members 324 promptly respond to reduced differential pressure and elastically spring from support portion 348 of support 338 toward their original shape and approximate cold clearance.

Figure 22:
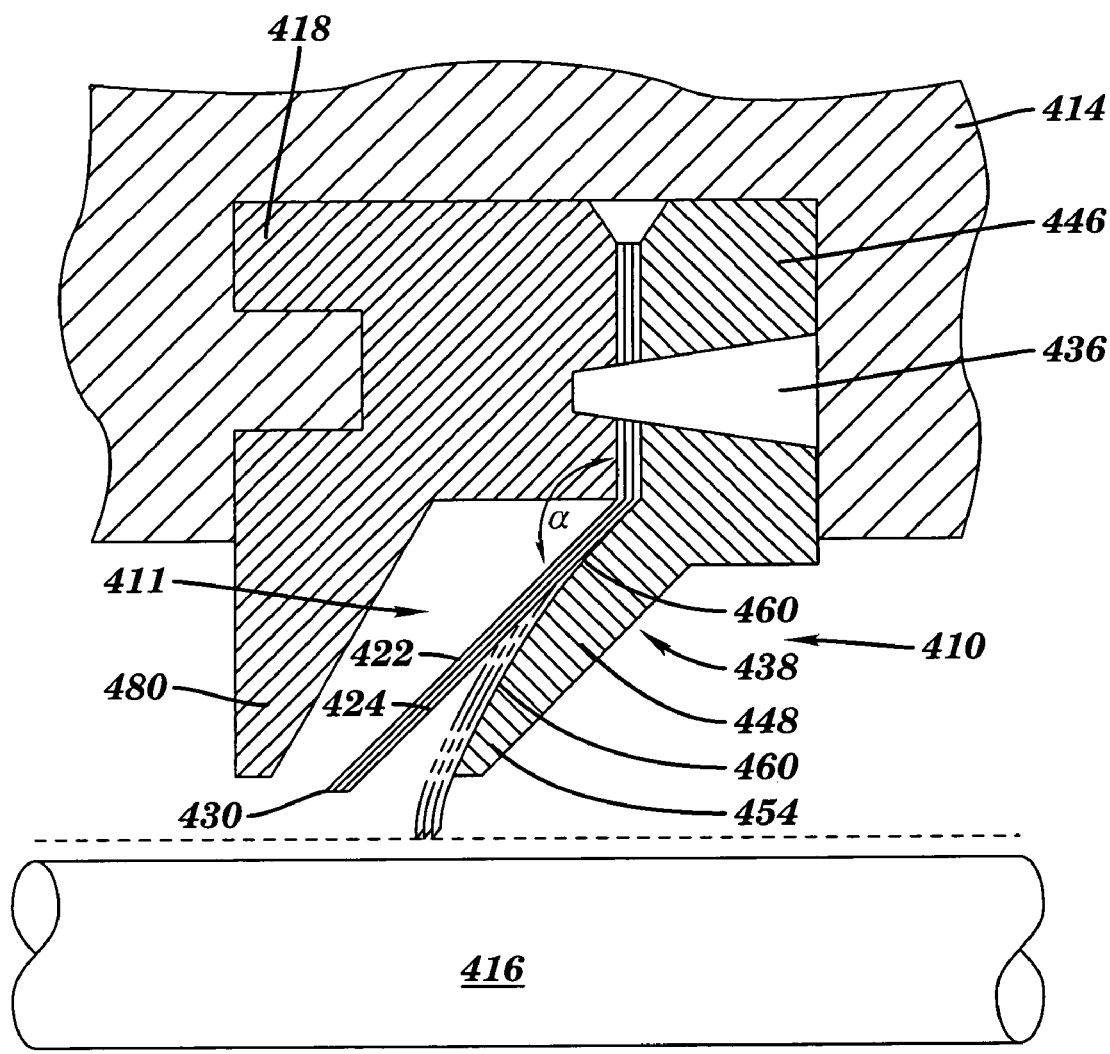
FIG. 22 shows a cross-sectional view of a fourth embodiment of the seal assembly.
Figure 23:
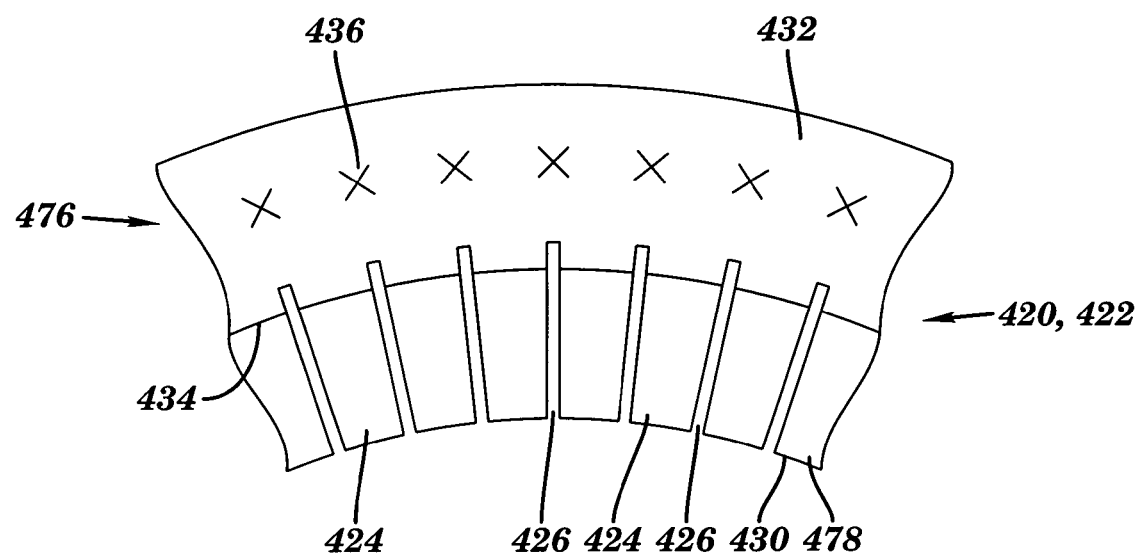
FIG. 23 shows a detail view of the fourth embodiment of FIG. 22.

Referring to FIGS. 22-23, another alternative embodiment of a seal assembly 410 is shown. As shown in FIG. 22, seal assembly 410 includes a leaf seal 411 including a plurality of leaf seal members 424 made, for example, of elements 420, 422 that each include a plurality of leaf seal members 424. Each two adjacent leaf seal members 424 have a slot 426 therebetween as shown in FIG. 23. In this embodiment, however, each leaf seal member 424 is formed with an arcuate, planar fixed portion 428 such that the fixed portion may be layered in a position substantially perpendicular to a longitudinal axis of a rotating component 416 (FIG. 22) to form the seal assembly. A free portion 430 of each leaf seal member 424, in the inoperative state is angled out-of-plane relative to its fixed portion 428 and slidably engages rotatable component 416 at an angle relative to the longitudinal axis thereof during operation to seal.

As shown in FIG. 22, support 438 functions similar to support 338 as previously discussed. In this case, support 438 includes an arcuate mount portion 446 (into and/or out of page) compatible with arcuate fixed end 428, e.g., substantially perpendicular to longitudinal axis of rotatable component 416, and an arcuate support portion 448 (into and/or out of page) compatible with free portion 430. As an alternative, support portion 448 of support 438 may include a curved surface 460 similar to that described relative to FIGS. 21A-C. A weld 436 may be provided through elements 420, 422 and support 438 to couple them to a holder 418. Holder 418 is keyed to non-rotating component 414 similar to holder 18 (FIG. 1). In one embodiment, holder 418 may be provided with a projection 480 having a diameter that is only slightly larger than a diameter of seal member free portion 430 such that holder 418 provides a measure of protection for seal elements 420, 422, for example, during shipping and installation.

The invention may also include a method of fabricating a seal assembly 310, 410 (FIGS. 21AC, 22, respectively) for sealing pressurized chambers of a rotary machine having a stator body 314, 414 and a rotor 316, 416 comprising the steps of: (a) forming a leaf seal 311, 411 including a plurality of leaf seal members 324, 424, the leaf seal 311, 411 including a fixed portion 328, 428 that is angled relative to a free portion 330, 430 thereof in an inoperative state; and (b) coupling the leaf seal 311, 411 to a support 338, 438, including a support portion 348, 448, such that free portion 330, 430 contacts a distal end 354, 454 of the support portion 348 in an operative state (FIG. 21B, 22) and is out of contact with the distal end in the inoperative state (FIG. 21A, 22). With regard to the step of forming and the FIGS. 22-23 embodiment, each element 420, 422, i.e., fixed portion 428, is preferably an arcuate member. However, each element 420, 422 may be formed from a planar annulus 476 (only a portion shown FIG. 23 for clarity), i.e., each fixed end 428 is one integral member. Seal assembly 410 is fabricated using seal elements 420, 422 having a plurality of leaf seal members 424 formed by cutting slots 426 radially into an inner edge 478 of annulus (or arcuate member) 476 similar to seal members 24 (FIGS. 5-9), as previously discussed. Slots 426 may be provided in a variety of shapes and dispositions similar to those shown in FIGS. 5-9. Each seal member 424 includes a fixed end 428 and a free end or portion 430. Free ends 430 are provided by forming seal members 424 integrally from arcuate fixed portion 428 of each element 420, 422. A plurality of annuluses 476 may then be layered, and then have an angle formed therein, e.g., by bending. The step of layering, however, may precede the cutting step described above. Layering may also include positioning leaf seal members 424 such that leaf seal members of each layer block slots 426 of another layer. The location of an angle α as indicated in FIG. 22 can be formed along an arc 434 as shown in FIG. 23. An appropriate mandrel (not shown) will include the proper arcuate surface to form angle α from elements 420, 422 having arcuate, planar fixed end 428. The layers of annuluses may then be coupled to a support 438.

With continuing reference to FIGS. 21A-23, the invention may also include a support 338, 438 for use with a leaf seal 311, 411 having a fixed portion 328, 428 and a free portion 330, 430 angled relative to the fixed portion. The support includes a mount portion 346, 446 for mounting fixed portion 328, 428; and a support portion 348, 448 for supporting free portion 330, 430 of the leaf seal, the support portion including a proximate end 352, 452 that contacts the free portion in an operative state and an inoperative state of the leaf seal, and a distal end 354, 454 that contacts the free portion in an operative state and is out of contact with the distal end in an inoperative state of the leaf seal.

Figure 24A:
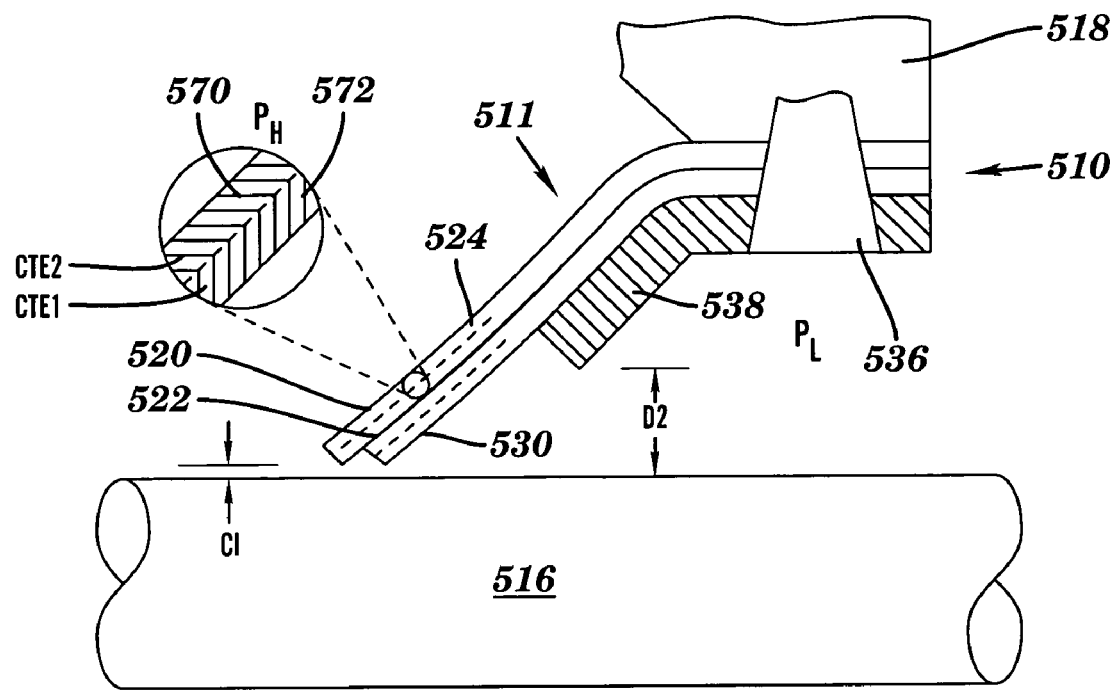
FIGS. 24A-B show cross-sectional views of operational states of a fifth embodiment of the seal assembly.
Figure 24B:
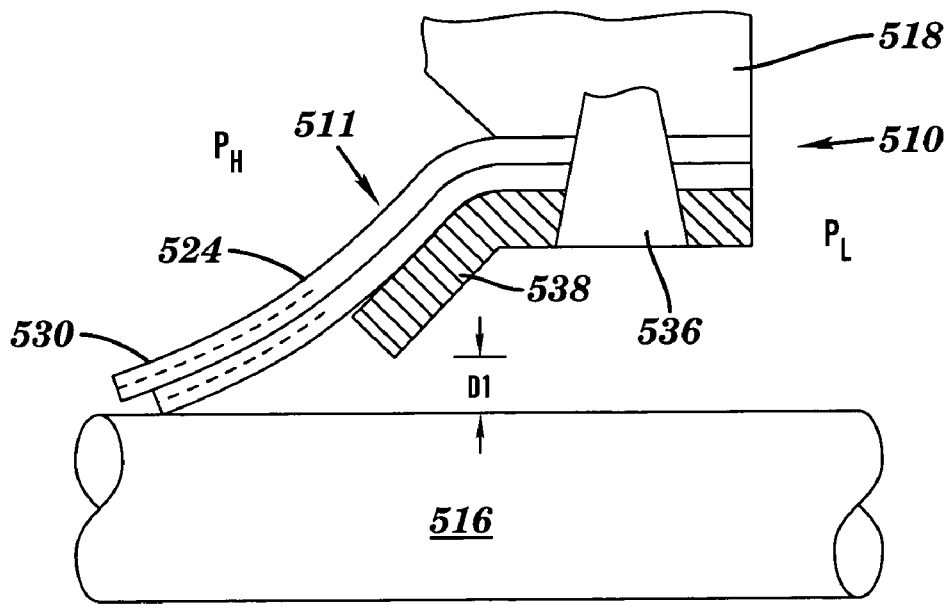

Referring to FIG. 24A, as an alternative embodiment, a seal assembly 510 may include a leaf seal 511 including a plurality of staggered leaf seal members 524 of elements 520, 522 with similar geometry to those described above but fabricated from a bimetallic material. Seal assembly 510 structure including support 538, holder 518, weld 536 and rotor 516 are similar in form and function to seal assembly embodiments discussed above. With regard to the bimetallic material, FIG. 24A inset, shows bimetallic cross section of seal member 524. Each leaf seal member 524 includes a first layer 570 of a first material addressing high pressure $P_H$ side of seal member 524, and a second layer 572 of a second material addressing low pressure $P_L$ side of seal member 524. In one embodiment, first material has a lower coefficient of thermal expansion ($CTE_1$) than second material ($CTE_2$). First layer 570 is bonded to second layer 572 in any now known or later developed fashion. An increase in bimetallic leaf seal temperature induces a change in shape causing seal members 524 to curl upward, increasing clearance with rotor 516. FIG. 24A illustrates normal operation with the extremities of free portion 530 and bimetallic seal members 524 in close proximity, C1, with rotor 516. Elevated operating temperature tends to curl seal members 524 upwardly. This movement is opposed by differential seal pressure, $P_H$–$P_L$, which tends to displace seal members 524 toward support member 538 and rotor 516. In FIG. 24B free portions 530 are in rubbing contact with rotor 516, and a separation of support 538 from rotor 516 is at a distance D1, which is reduced compared to distance D2 in FIG. 24A. As frictional heating of bimetallic seal members 524 occurs, increased temperature induces additional shape change to lift seal members 524 from rotor 516 relieving imposed rub force and further frictional heating, as illustrated by increased curvature of seal members 524 in FIG. 24B. In combination, metallic materials 570, 572 (i.e., via the different coefficients of thermal expansion and other physical properties), operating differential pressure $P_H$–$P_L$, leaf seal thickness, length, strength, and the cooperation with support member 538, act to relieve wear during a rub and extend a leaf seal's ability to operate under less extreme operational situations. Support 538 may also include a curved surface 560, similar to that shown in seal assembly 410 in FIG. 21A.

With further regard to the embodiments of FIGS. 21A-24B, leaf seal members 324, 424, 524 may be cut or formed in any manner described relative to the earlier embodiments. For example, leaf seal members 330, 430, 530 may be formed to comply with rotatable component 316, 416, 516 when in operation as previously described and illustrated in FIG. 13. That is, free portion 330, 430, 530 of each seal member may be axially parallel and/or circumferentially parallel a surface of rotatable component 316, 416, 516. In addition, leaf seal members may be non-uniformly spaced; have diverging slots; have respective elements juxtaposed such that seal members of each element block slots of another element; and/or have slots that are provided at an angle relative to a surface of each element.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A seal assembly for sealing against a rotatable component having a longitudinal axis, the seal assembly comprising:
 a leaf seal including a plurality of staggered leaf seal members, each leaf seal member including:
  a free portion arranged at an acute angle relative to the longitudinal axis of the rotatable component, and
  a fixed portion that is angled relative to the free portion; and
 a support having a substantially frusto-conically shaped support portion facing a high pressure side of the leaf seal for supporting the free portion from a radially inward position relative to the free portion and a mount portion for coupling to a non-rotatable component,
 wherein the free portion contacts only a proximate end of the support portion adjacent to the mount portion in an unpressurized state of the leaf seal and the free portion contacts both the proximate end and a distal end of the support portion in a pressurized state of the leaf seal, the free portion being closer to the rotatable component during the pressurized state than in the unpressurized state.

2. The seal assembly of claim 1, wherein each leaf seal member includes a first layer including a first material addressing a high pressure side of the leaf seal and a second layer of a second material addressing a low pressure side of the leaf seal, wherein the first material has a lower coefficient of thermal expansion than the second material.

3. The seal assembly of claim 1, wherein the support portion includes a curved surface extending from the proximate end of the support portion to the distal end.

4. The seal assembly of claim 3, wherein the free portion extends tangentially from the curved surface in the unpressurized state.

5. The seal assembly of claim 1, wherein the plurality of staggered leaf seal members are provided by a spiral of a single strip of material.

6. The seal assembly of claim 1, wherein the plurality of staggered leaf seal members are fixed together at the fixed portion by a weld.

7. The seal assembly of claim 1, wherein the fixed portion is positioned substantially parallel to a radial axis of the non-rotatable component, and the free portion is angled out-of-plane relative to the fixed portion.

8. The seal assembly of claim 1, wherein the distal end of the support portion is thinner than the proximate end of the support portion.

9. The seal assembly of claim 1, further comprising a holder for mounting the seal assembly to the non-rotatable component, wherein the holder includes a projection for protecting the free portion.

10. The seal assembly of claim 1, wherein the fixed portion is provided by an arcuate member in each leaf seal member.

11. A rotary machine comprising:
 a rotatable component and a non-rotatable component, the components lying about a common axis;
 a seal assembly between the components, the seal assembly including:
  a leaf seal including a plurality of staggered leaf seal members, each leaf seal member including:
   a free portion arranged at an acute angle relative to the longitudinal axis of the rotatable component, and
   a fixed portion that is angled relative to the free portion; and
  a support having a substantially frusto-conically shaped support portion facing a high pressure side of the leaf seal for supporting the free portion from a radially inward position relative to the free portion and a mount portion for coupling to the non-rotatable component,
  wherein the free portion contacts only a proximate end of the support portion adjacent to the mount portion in an unpressurized state of the leaf seal and the free portion contacts both the proximate end and a distal end of the support portion in a pressurized state of the leaf seal, the free portion being closer to the rotatable component during the pressurized state than in the unpressurized state.

12. The rotary machine of claim 11, wherein each leaf seal member includes a first layer including a first material addressing a high pressure side of the leaf seal and a second layer of a second material addressing a low pressure side of the leaf seal, wherein the first material has a lower coefficient of thermal expansion than the second material.

13. The rotary machine of claim 11, wherein the support portion includes a curved surface extending from the proximate end to the distal end.

14. The rotary machine of claim 11, wherein the distal end of the support portion is thinner than the proximate end of the support portion.

* * * * *